United States Patent [19]

Cyphelly

[11] 3,896,912
[45] July 29, 1975

[54] HYDROSTATIC CLUTCH

[76] Inventor: Ivan Jaroslav Cyphelly, Neuhaus, 8128 Hinteregg, Switzerland

[22] Filed: May 17, 1974

[21] Appl. No.: 471,031

[30] Foreign Application Priority Data
June 29, 1973 Switzerland.......................... 9530/73

[52] U.S. Cl. .............................. 192/61; 192/113 B
[51] Int. Cl. ............................................ F16d 31/04
[58] Field of Search..... 192/59, 58 R, 60, 61, 113 B

[56] References Cited
UNITED STATES PATENTS

| | | | |
|---|---|---|---|
| 864,724 | 8/1907 | Brown.................................. | 192/61 |
| 1,956,893 | 5/1934 | Carter................................. | 192/61 X |
| 2,193,806 | 3/1940 | De Vore .............................. | 192/61 |
| 2,704,141 | 3/1955 | Doshier............................... | 192/61 |
| 3,104,746 | 9/1963 | Gadd et al......................... | 192/113 B |

FOREIGN PATENTS OR APPLICATIONS

| | | | |
|---|---|---|---|
| 337,564 | 11/1930 | United Kingdom................... | 192/61 |

*Primary Examiner*—Allan D. Herrmann
*Attorney, Agent, or Firm*—Hans Berman

[57] ABSTRACT

A clutch connecting an input shaft to a coaxial output shaft includes a rotary, gear-type pump whose casing is fixedly mounted on the input shaft while the output shaft carries the driven gear of the pump. A valve in the pumping circuit between the intake and discharge ports of the casing engages the clutch in the closed position. A cooling pump driven by one of the shafts drives cooled oil through the casing, and the resulting heat transfer between the cooled oil and the oil circulated by the gear pump maintains high viscosity in the oil in the gear casing and prevents oil leakage and resulting slipping of the engaged clutch. Transmission of residual torque between the shafts when the clutch is disengaged by opening the valve can be reduced or eliminated by blocking the circuit of the cooling pump.

10 Claims, 5 Drawing Figures

HYDROSTATIC CLUTCH

This invention relates to clutches, and particularly to a hydrostatic clutch in which the casing and a pumping element of a positive displacement pump are drivingly connected, respectively, to the shafts to be coupled by the clutch, and the clutch is engaged and disengaged by closing and opening a valve in the pumping circuit which connects the intake and discharge ports of the valve casing.

Such hydrostatic clutches have been employed as vibration damping elements in drive trains of marine engines, but they have not found a wide field of application because of two inherent shortcomings of the known hydrostatic clutches. They transmit residual torque when disengaged as fully as possible, and some slippage is unavoidable when the known clutches are fully engaged.

The primary object of this invention is the provision of a hydrostatic clutch in which residual torque transmission by the disengaged clutch and/or slippage of the engaged clutch is greatly reduced, as compared to otherwise analogous known clutches of this type, or entirely eliminated.

It has now been found that the performance of hydrostatic clutches can be improved substantially, and the shortcomings pointed out above can be obviated largely or entirely by providing the clutch with a temperature controlling mechanism which holds the temperature of the hydraulic fluid in the pump casing low, and thereby reduces its viscosity when leakage and slipping of the clutch is to be avoided.

The clutch of the invention thus may include an input shaft, an output shaft, and a positive displacement pump whose cassing element has an intake port and a discharge port communicating with the casing cavity. The casing element and a pumping element movable in the cavity of the casing element are connected to the two shafts respectively for pumping a fluid between the two ports when one of the shafts rotates at a speed different from that of the other shaft. A pumping circuit which connects the ports includes a valve. An actuating device moves the valve between a first position in which the valve blocks the pumping circuit, and the clutch is engaged for transmitting torque between the shafts, and a second position in which liquid filling the casing and the conduit is free to be pumped through the circuit, whereby the clutch is disengaged. A temperature control arrangement responds to the moving of the valve for withdrawing thermal energy from the liquid in the casing at a higher rate when the valve is in its first position than when the valve is in its second position.

Other features, additional objects, and many of the attendant advantages of this invention will readily be appreciated as the same becomes better understood by reference to the following detailed description of preferred embodiments when considered in connection with the appended drawing in which.

Figure 1:
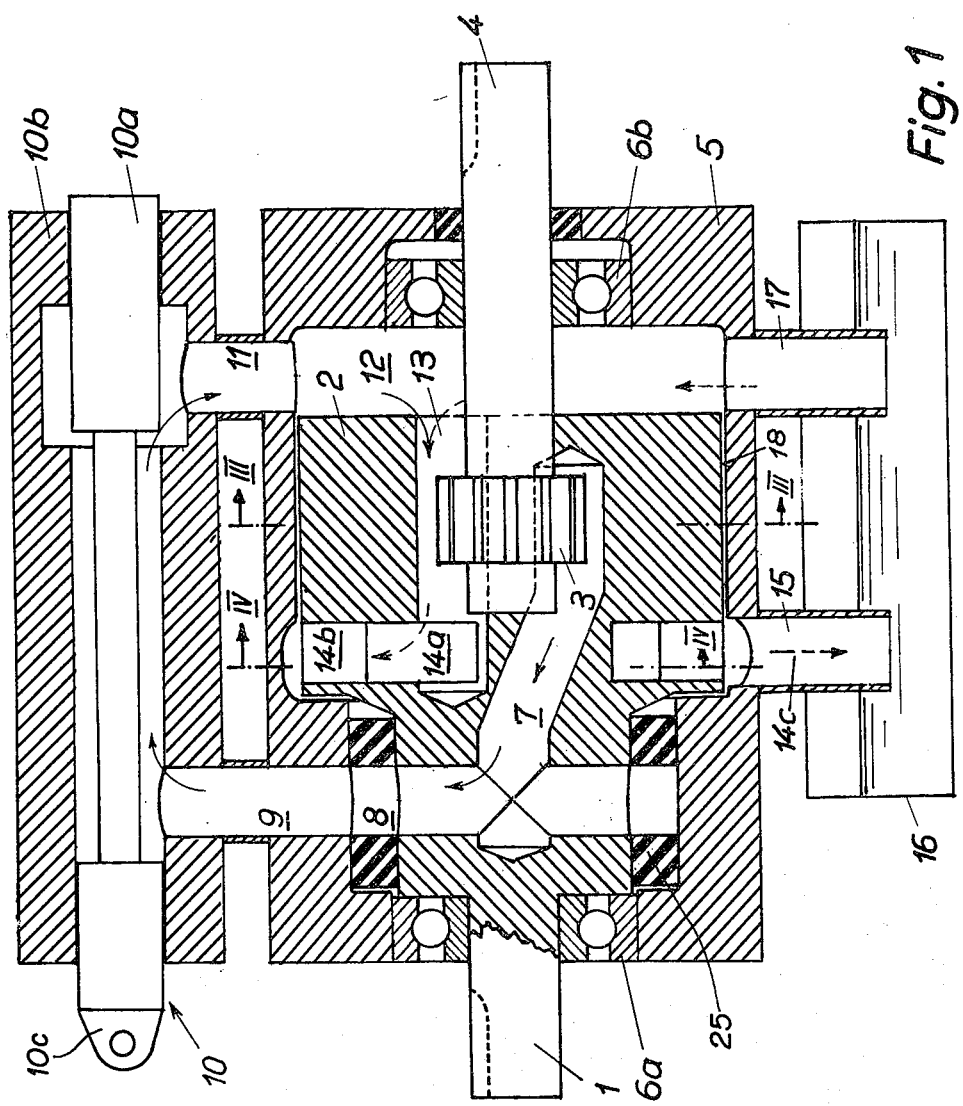
FIG. 1 shows a hydrostatic clutch of the invention in section on its axis.
Figure 3:
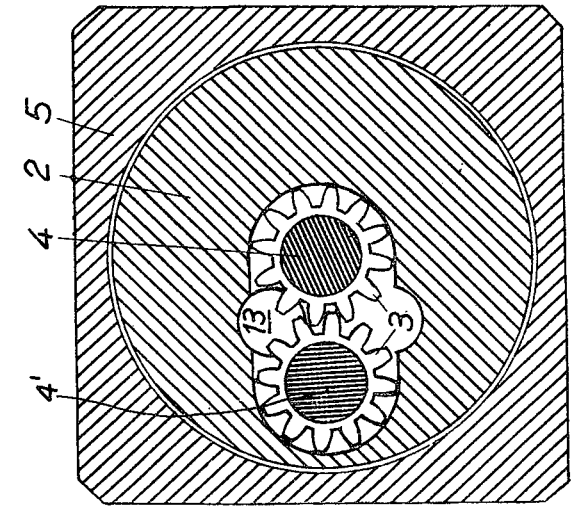
FIG. 3 illustrates a positive displacement pump common to the clutches of FIGS. 1 and 2 in section on the line III — III.

Referring initially to FIG. 1, there is shown a clutch of the invention which transmits torque between coaxial shafts 1 and 4 when engaged. For the convenience of the description, the shaft 1 will be referred to hereinafter as the input or driven shaft, and the shaft 4 as the output or driving shaft although the roles of the shafts may be reversed without any change in the illustrated structure. The casing 2 of a gear-type rotary pump having two meshing gears 3 is fixedly mounted on the input shaft 1, and one of the gears 3 is fixedly mounted on the output shaft 4, the other gear 3 being journaled in the casing 2 on an idler shaft 4', as is best seen in FIG. 3.

The casing 2 is generally cylindrical in shape and is rotatably supported in a stationary housing 5 by means of ball bearings 6a, 6b interposed between the shafts 1, 4 respectively and the housing 5. The gears 3, when rotating relative to the casing 2, drive hydraulic fluid from an intake port 13 in the casing 2 into a discharge port 7 communicating with an annular channel 8 axially bounded between the casing 2 and the housing 5 by sealing rings 25. Liquid may flow from the channel 8 through a conduit 9 partly received in the housing 5 into the stationary, tubular body 10b of a slide valve 10. A slide 10a may be moved axially in the body 10b by an actuating handle 10c between the illustrated position in which liquid may flow past the slide 10a from the conduit 9 into a conduit 11, and a position in which the conduits 9, 11 are sealed from each other. A radial end face of the casing 2 is axially separated from a corresponding inner face of the housing 5 by a chamber 12 communicating with the conduit 11.

Figure 4:
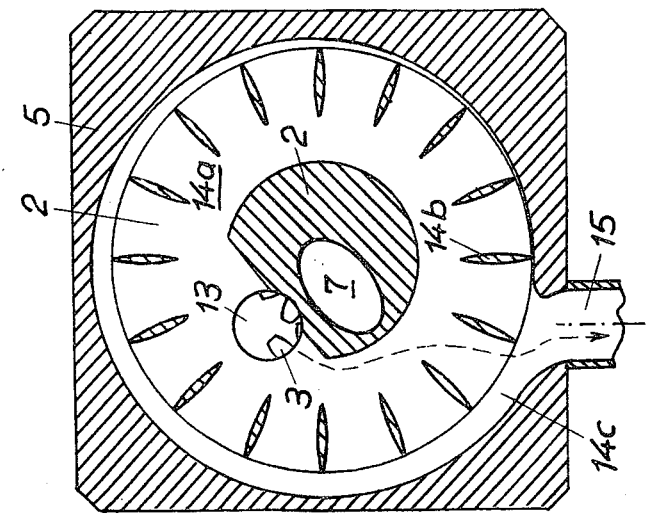
FIG. 4 shows a centrifugal secondary pump in the apparatus of FIG. 1 in section on the line IV — IV.

The impeller of a centrifugal pump is integral with or otherwise fixedly secured on the casing 2 for rotation about the common axis of the shafts 1, 4. As is best seen in FIG. 4, the annular cavity 14a of the secondary centrifugal pump communicates with the intake port 13 which is wide enough to permit unimpeded flow of liquid into the cavity 14a past the teeth of the gear 3. The impeller vanes or blades 14b are fixedly mounted on the casing 2 and drive the pumped liquid into a volute chamber 14c formed in an inner circumferential face of the stationary housing 5. A discharge line 15 connects the chamber 14c with an oil sump 16 which also communicates with the chamber 12 through a suction conduit 17. The oil sump 16 is of sufficient size that its aircooled surface may dissipate thermal energy from the oil heated during passage through the clutch as fast as the oil reaches the sump 16.

The clutch is controlled by means of the valve handle 10c. In the illustrated position of the slide 10a, oil flows simultaneously in two circuits indicated by arrows respectively drawn in full lines and in broken lines. The shafts 1 and 4 are free to rotate relative to each other, and the rotating gears 3 pump oil in a closed pumping circuit through the port 7, channel 8, conduit 9, the open slide valve 10, the conduit 11, the chamber 12, and the port 13.

The centrifugal cooling pump 14a, 14b, 14c simultaneously drives oil through the discharge line 15 into the sump 16, and draws cold oil from the sump through the suction conduit 17, the chamber 12, and the intake port 13 which is common to the two pump circuits.

Liquid fills the pump casing 2 and the associated ports and conduits, as well as the centrifugal pump and its associated conduits. As long as the valve 10 is open, the liquid pumped by the gears 3 in the disengaged clutch converts relatively little mechanical energy into thermal energy by internal friction, and the rate of heat transfer between the oil circulated through the gears 3 and the cooled oil circulated through the sump 16 is low and normally negligible.

When the valve 10 is closed in the non-illustrated position of the slide 10a, relative rotation of the shafts 1, 4 is possible only to the extent that oil can leak past the teeth of the gears 3 between the intake conduit 13 and the discharge duct 7. In the absence of the fresh-oil circuit through the sump 16, any minor initial leak past the pump gears 3 would cause a rise in oil temperature and a corresonding decrease in oil viscosity which in turn would enhance leakage so that slip in the clutch may reach an undesirable level. However, the continuous flow of cool oil drawn from the sump 16 over the teeth of the gears 3, as is best seen in FIG. 4, maintains a low temperature and a correspondingly high viscosity in such oil as may leak past the gears 3 and holds slip in the clutch to a minimum. The effectiveness of the sump 16 as an oil cooler is not significantly affected by the narrow by-pass formed between the chamber 12 and the volute chamber 14c in the annular clearance space 18 between the opposing cylindrical surfaces of the casing 2 and the housing 5, and it has been found that it is not worthwhile to block this by-pass by a sealing ring.

Heat generated in the small amount of oil contained in the casing 2 of the engaged clutch is thus removed at a high rate by the rapid stream of cooled oil circulated from the sump 16, and at a rate higher than the rate of heat transfer observed when the valve 10 is open, such rate of heat transfer being per unit weight of oil passing into the discharge port 7 from the intake port 13.

Figure 2:
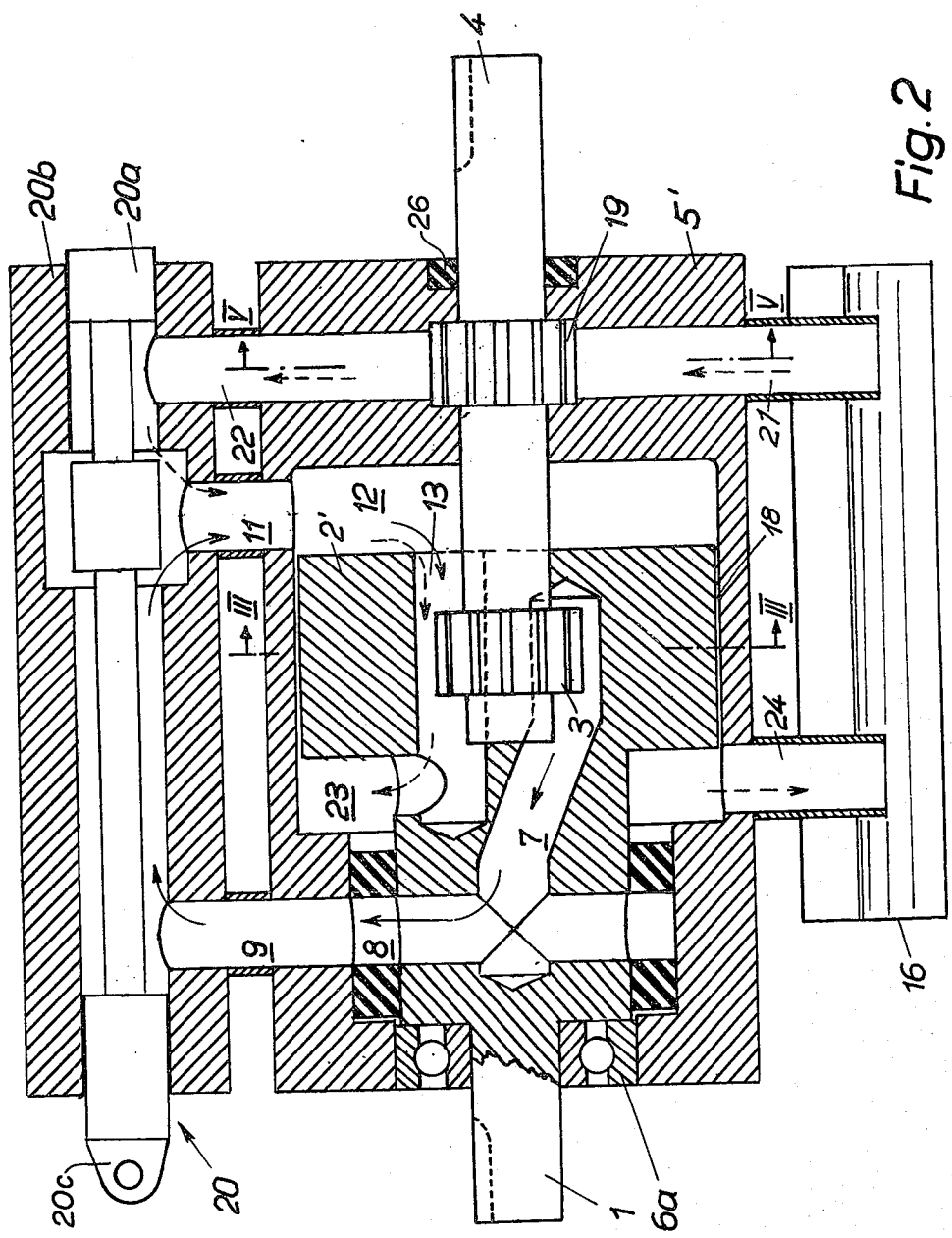
FIG. 2 shows a modification of the clutch of FIG. 1 in a corresponding view.
Figure 5:
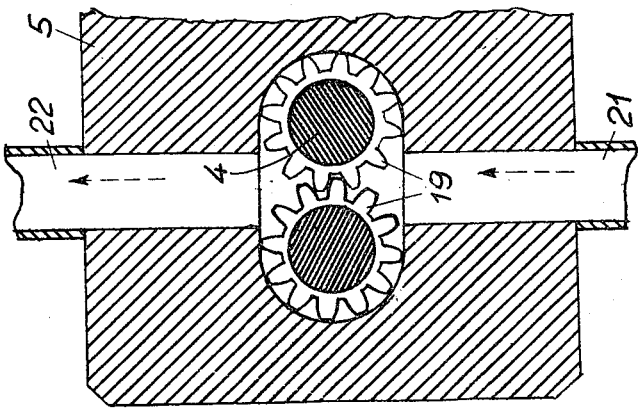
FIG. 5 illustrates a gear-type secondary pump in section on the line V — V in the apparatus of FIG. 2.

The modified clutch of the invention shown in FIGS. 2, 3, and 5 has elements identical with those of the afore-described apparatus and designated by the same reference numerals, and other elements closely analogous in function and structure to their counterparts in FIG. 1 and identified by corresponding primed reference numerals.

The shaft 1 is integral with the casing 2' of a gear pump whose gears 3 are mounted on the output shaft 4 and an idler shaft 4' as is shown in FIG. 3. The shaft 4 is journaled in a housing 5' in two axially spaced sleeve bearings, of which one is sealed from the ambient atmosphere by a sealing ring 26, and in the casing 2'.

The pumping circuit associated with the gear pump 3 includes a discharge port 7, an annular channel 8, and a conduit 9 leading to a valve 20, a conduit 11 returning from the valve to a chamber 12 in the casing 5' from which the gear pump draws oil through an intake port 13.

The valve 20 has a slide 20a axially moved in the bore of the valve body 20b by an actuating handle 20c. The slide 20a may alternatively seal the conduit 11 from the conduit 9 or from a conduit 22 which is the discharge conduit of a rotary, auxiliary cooling pump whose driven gear 19 is mounted on the shaft 4 while the meshing other gear 19 is driven by engagement with the driven gear in the usual manner, as is shown in FIG. 5. The suction conduit 21 of the cooling pump 19 dips into the sump 16.

In the illustrated intermediate position of the valve, the gears 3 pump liquid in the afore-described circuit while the cooling oil discharged from the conduit 22 into the valve 20 flows through the conduit 11, the chamber 12, the intake conduit 13 into an annular chamber 23 bounded by the casing 2' and the stationary housing 5', and is released from the chamber 23 into the oil sump 16 through a return conduit 24.

When the valve slide 20a is shifted toward the right from the position illustrated in FIG. 2, the cooling circuit of the auxiliary pump 19 is blocked, and the pump acts as a hydrostatic brake on the shaft 4. The oil pumped by the gears 3 while the casing 2 is being turned by the shaft 1 is heated by friction under practically adiabatic conditions so that its viscosity decreases and the torque transmitting effect of the oil is reduced. The clutch is disengaged.

When the valve slide 20a is shifted toward the left from the illustrated position, the pumping circuit of the gear pump 3 is blocked, and the relative movement of the shaft 1 and casing 2' is almost prevented by the stagnant oil in the pump. The limited movement of the gears 3 permitted by oil leakage is decreased by the mixing of the oil in the conduit 13 with cool oil continuously circulated by the auxiliary or secondary pump 19. There is little slip in the engaged clutch, if any, as long as thermal energy generated in the oil filling the casing 2' is quickly dissipated.

While a positive displacement pump employing gears 3 as pumping elements is advantageous because of its low cost, reliability, and low bulk, other positive displacement pumps may be substituted in an obvious manner, rotary pumps being generally preferred, but even a reciprocating pump could be connected by suitable linkages between the shafts 1, 4 to perform in the desired manner.

The use of the same liquid, hydraulic fluid or oil, in the circuits of the prncipal pump and of the cooling pump has the advantage of permitting intermingling of the fluids of the two circuits for intensive heat exchange. Indirect heat exchange between the two circuits is possible, but not normally practical.

The surface of the sump 16 may adequately dissipate the thermal energy introduced into the sump with the circulated cooling oil if the sump is large relative to the cooling liquid circulated. Where this condition does not prevail, the oil may be cooled by means of air forced by a blower over fins on the sump surface or by an oil cooler in which the oil flows through narrow metal ducts surrounded by an air stream. The use of cooling coils in the sump 16 is specifically contemplated for clutches transmitting high torque.

Clutches and brakes are analogous closely enough so that the instant teachings may readily be transferred to analogous brake arrangement, and the term output shaft, as employed herein, embraces a stationary shaft whereby the clutch becomes a brake for the input shaft.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A hydrostatic clutch comprising:
   a. an input shaft;

b. an output shaft;
c. a positive displacement pump including a casing element having a cavity, an intake port and a discharge port communicating with said cavity, and a pumping element movable in said cavity,
  1. said elements being connected to said shafts respectively for pumping a fluid from said intake port to said discharge port when one of said shafts rotates at a speed different from the speed of rotation of the other shaft;
d. conduit means constituting a pumping circuit connecting said ports;
e. valve means in said circuit;
f. a body of liquid in said circuit and in said casing element;
g. actuating means for moving said valve means between a first position in which said valve means blocks said circuit, whereby said clutch is engaged for transmitting torque between said shafts, and a second position in which said liquid is free to be pumped through said circuit by said pump, whereby said clutch is disengaged; and
h. temperature control means responsive to said moving of said valve means for withdrawing thermal energy from said liquid in said casing element at a higher rate when said valve means is in said first position than when said valve means is in said second position.

2. A clutch as set forth in claim 1, wherein said temperature control means include a secondary pump drivingly connected to one of said shafts, a source of cooling fluid, and conduit means constituting a cooling circuit for circulation of said cooling fluid from said source to said secondary pump and back to said source when said secondary pump is driven, the fluid in a portion of said cooling circuit being in heat-transmitting contact with the liquid in said casing element.

3. A clutch as set forth in claim 2, wherein a conduit in said casing is common to said pumping circuit and to said portion of said cooling circuit, said liquid and said fluid are of the same composition and in direct contact in said conduit.

4. A hydrostatic clutch comprising:
a. an input shaft;
an output shaft;
c. a positive displacement pump including a casing element defining a cavity and a pumping element movable in said cavity,
  1. said casing element being formed with an intake port and a discharge port communicating with said cavity,
  2. said elements being drivingly connected to said shafts respectively for pumping a fluid from said intake port to said discharge port when one of said shafts rotates relative to the other shaft;
d. a source of hydraulic fluid;
e. a valve interposed between said ports;
f. actuating means for opening and closing said valve;
g. secondary pump means drivingly connected to one of said shafts and interposed between said source and said intake port for pumping said fluid into said intake port when said connected shaft rotates; and
h. a conduit connecting said intake port to said source.

5. A clutch as set forth in claim 4, further comprising a stationary housing, said secondary pump and said valve being mounted on said housing, said shafts being journaled coaxially in said housing, and said elements being fixedly fastened to the respective, drivingly connected shafts.

6. A clutch as set forth in claim 5, wherein said secondary pump means includes a centrifugal pump having an impeller, said impeller and said casing element being mounted on said input shaft.

7. A clutch as set forth in claim 5, wherein said secondary pump means includes a positive displacement pump having a movable pump element, the movable pump elements of said positive displacement pumps being mounted on said output shaft.

8. A clutch as set forth in claim 7, wherein said secondary pump means, said source, and said conduit jointly constitute a cooling circuit, said clutch further comprising secondary valve means in said cooling circuit operatively connected to said actuating means for blocking said cooling circuit when said valve is opened by said actuating means.

9. A clutch as set forth in claim 5, wherein said pumping element is partly received in said intake port for contact with the fluid pumped by said secondary pump means.

10. A clutch as set forth in claim 1, wherein said valve means constitutes the only connection of said ports outside said cavity.

* * * * *